United States Patent Office 3,111,541
Patented Nov. 19, 1963

3,111,541
NOVEL AROMATIC SULFIDES AND METHOD OF PREPARING SAME
Donald W. Slocum, Bronx, N.Y., assignor to American Cyanamid Company, New York, N.Y., a corporation of Maine
No Drawing. Filed Feb. 1, 1960, Ser. No. 5,647
6 Claims. (Cl. 260—578)

The present invention relates to novel o-aminophenyl 2-mercaptoalkyl sulfides and the preparation of same. More particularly, the instant discovery concerns o-aminophenyl 2-mercaptoalkyl sulfides conforming to the formula

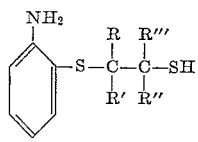

wherein R, R', R'' and R''' correspond, respectively, to hydrogen; branched and straight chain, substituted and unsubstituted lower alkyl; branched and straight chain, substituted and unsubstituted lower alkenyl; the substituents for alkyl and alkenyl being selected from the group consisting of —$NH_2$, —CCOH, —OH, —CN, halogen, and the like, as will be seen hereinafter.

Quite surprisingly it has been found pursuant to the instant discovery that o-aminophenyl 2-mercaptoalkyl sulfides conforming to the formula above may be prepared by the relatively simple step of reacting 2-aminothiophenol and a cyclic organic sulfide (episulfide) of the formula

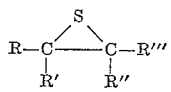

wherein R, R', R'' and R''' have the same meaning, respectively, as R, R', R'' and R''' in the product formula, above, and recovering the corresponding o-aminophenyl 2-mercaptoalkyl sulfide product.

The following generally typical equation is intended to foster a ready understanding of the present invention:

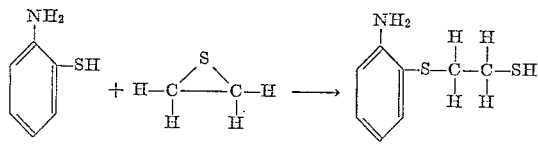

This reaction is unexpectedly straightforward and simple, particularly in view of the fact that the —$NH_2$ moiety is not affected. In U.S. Patent 2,105,845, issued January 18, 1938, and as reported by Snyder et al., J.A.C.S., 69, (November 1947), p. 2673, and the like, ethylene sulfide and aniline react readily to yield product $C_6H_5N(CH_2CH_2SH)_2$. Obviously, therefore, ethylene sulfide shows a substantial affinity for reacting with the —$NH_2$ moiety.

Typical cyclic organic sulfide reactants contemplated herein and suitable for reaction with 2-aminothiophenol under conditions to be discussed in greater detail hereinafter to produce corresponding o-aminophenyl 2-mercaptoalkyl sulfides are the alkylene sulfides, such as ethylene sulfide

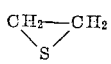

propylene sulfide

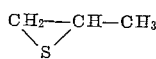

symmetrical dimethyl ethylene sulfide

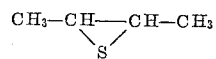

isobutylene sulfide

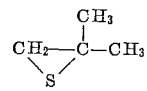

unsymmetrical methyl ethyl ethylene sulfide

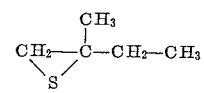

α-amylene sulfide

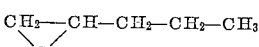

symmetrical methyl ethyl ethylene sulfide

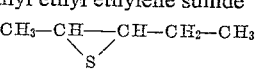

isopropyl ethylene sulfide

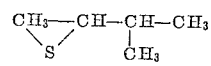

trimethyl ethylene sulfide

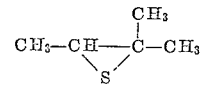

and the like.

Similarly, unsaturated episulfides, such as butadiene monosulfide

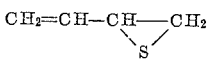

isoprene monosulfide

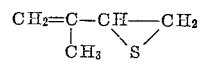

and the like, are suitable reactants. Cyclic sulfides containing other substituents, such as halogen, —$NH_2$, —OH, —COOH, —CN, and the like, such as hydroxypropylene sulfide

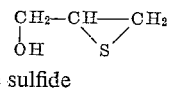

monochlor ethylene sulfide

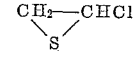

and other similar substituted cyclic organic sulfides are also contemplated.

While reaction is best carried out at temperatures in the range of 15° C. to 85° C., an even broader temperature range is contemplated. Desirable results are obtained, for example, at temperatures from 0° C. to 100° C.

By the same token, although the reaction contemplated herein is usually carried out at atmospheric pressure, good results can be obtained at super- or sub-atmospheric pressures. Likewise, reaction may be made to take place in a batch, continuous or semi-continuous manner; furthermore, the sequence of addition is not critical.

Optionally, an inert organic solvent, preferably a non-polar solvent, such as $CCl_4$, $C_6H_6$, and the like, may be employed to effect intermingling of the reactants.

Generally, the reactants are brought together in equimolar quantities. However, any practical excess of 2-aminobenzenethiol reactant over the episulfide may be employed with no deleterious effect upon the nature of the product; as to the episulfide reactant an excess over 2-aminobenzenethiol of up to about 75 percent by weight may be employed.

The following examples best illustrate the reaction contemplated herein:

EXAMPLE I

To 25 grams (0.2 mole) of 2-aminobenzenethiol is added 12 grams (0.2 mole) of ethylene sulfide. The resulting mixture is stoppered and allowed to stand for 18 days at room temperature. Vacuum distillation produces a fraction boiling in the temperature range of 115° C.–119° C. at 0.14 to 0.18 millimeter mercury pressure. This fraction is identified as o-aminophenyl 2-mercaptoethyl sulfide, and about a 72 percent by weight yield is realized.

EXAMPLES II–X

As in Example I, above, equimolar amounts of 2-aminobenzenethiol and the reactants in the following table are brought together, stoppered and allowed to stand at room temperature for several weeks. The corresponding products, also given in the table below, are recovered in good yields:

*Table I*

| Example | Reactant | Product |
|---|---|---|
| II | symmetrical dimethyl ethylene sulfide. | o-aminophenyl 2-mercapto-1-methylpropyl sulfide. |
| III | unsymmetrical methyl ethyl ethylene sulfide. | o-aminophenyl 2-mercapto-2-methylbutyl sulfide. |
| IV | α-amylene sulfide | o-aminophenyl 2-mercaptopentyl sulfide. |
| V | trimethyl ethylene sulfide | o-aminophenyl 2-mercapto-1,2-dimethylpropyl sulfide. |
| VI | tetramethyl ethylene sulfide. | o-aminophenyl 2-mercapto-1,1,3-trimethylpropyl sulfide. |
| VII | isoprene monosulfide | o-aminophenyl 2-mercapto-3-methyl-3-butenyl sulfide. |
| VIII | butadiene monosulfide | o-aminophenyl 2-mercapto-3-butenyl sulfide. |
| IX | hydroxypropylene sulfide | o-aminophenyl 3-hydroxy-2-mercaptopropyl sulfide. |
| X | monochlor ethylene sulfide | o-aminophenyl 2-chloro-2-mercaptoethyl sulfide. |

Other typical products within the purview of the instant discovery and produced according to the process defined herein are: o-aminophenyl 1-ethyl-2-mercaptopropyl sulfide; o-aminophenyl 1-(mercaptomethyl)butyl sulfide; o-aminophenyl 2-mercapto-1,1-dimethylpropyl sulfide; o-aminophenyl 1-mercaptomethyl-2-methyl-2-propenyl sulfide; o-aminophenyl 1-(mercaptomethyl)allyl sulfide; o-aminophenyl 1-(hydroxymethyl)-2-mercaptoethyl sulfide; o-aminophenyl 1-chloro-2-mercaptoethyl sulfide; and the like.

The compounds of the present invention are useful as fungicides and herbicides. The following tables illustrate this activity (all percentages given as percent by weight):

*Table II*

| o-Aminophenyl mercaptoethyl sulfide (Percent concentration) | *Sclerotinia fructigena*, Percent Kill [1] |
|---|---|
| .01 | 100 |

[1] Numerical percentage.

*Table III*

| o-Aminophenyl 2-mercaptoethyl sulfide (Percent concentration) | Radish Seeds, Percent Kill [1] | Wheat Seeds Percent Kill [1] |
|---|---|---|
| 0.1 | 98 | 100 |

[1] Numerical percentage.

Referring to Table II, above, a water mixture of 0.01 percent o-aminophenyl 2-mercaptoethyl sulfide produced according to the present invention is prepared and the spores admixed therewith for a twenty hour period. After this period the spores are examined microscopically to determine percent germination.

Referring to Table III, above, about 50 seeds of each species are placed in special one ounce bottles together with 25 cubic centimeters of water containing 0.1 percent by weight of o-aminophenyl 2-mercaptoethyl sulfide. At the end of this period percent mortality is recorded.

Obviously the various novel compounds produced as described above manifest slightly different fungicidal and herbicidal activity and the results given in Tables II and III, above, are merely exemplary.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. An o-aminophenyl 2-mercaptoalkyl sulfide conforming to the formula

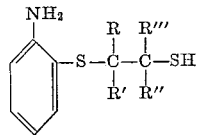

wherein R, R', R" and R'", respectively, are selected from the group consisting of H, branched and straight chain lower alkyl, substituted branched and straight chain lower alkyl, branched and straight chain lower alkenyl, and branched and straight chain substituted lower alkenyl, the substituents for alkyl and alkenyl being selected from the group consisting of —NH$_2$, —OH, and chlorine.

2. o-Aminophenyl 2-mercaptoethyl sulfide.

3. A method of preparing an o-aminophenyl 2-mercaptoalkyl sulfide conforming to the formula

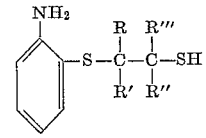

wherein R, R', R" and R'", respectively, are selected from the group consisting of H, branched and straight chain lower alkyl, substituted branched and straight chain lower alkyl, branched and straight chain lower alkenyl, and branched and straight chain substituted lower alkenyl, the substituents for alkyl and alkenyl being selected from the group consisting of —NH$_2$, —OH and chlorine, which comprises reacting, at a temperature in the range of 0° C. to 100° C., equimolar quantities of 2-aminothiophenol and a cyclic organic sulfide of the formula

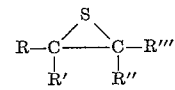

wherein R, R', R" and R'" having the same meaning, respectively, as R, R', R" and R'" in the product formula, above, and recovering the corresponding o-aminophenyl 2-mercaptoalkyl sulfide.

4. The method of claim 3 wherein the cyclic organic sulfide is ethylene sulfide and the product recovered is o-aminophenyl 2-mercaptoethyl sulfide.

5. A method which comprises reacting at a temperature in the range of 0° C. to 100° C., equimolar quantities of 2-aminothiophenol and monochloro ethylene sulfide and recovering the corresponding o-aminophenyl 2-chloro-2-mercaptoethyl sulfide.

6. o-Aminophenyl 2-chloro-2-mercaptoethyl sulfide.

(References on following page)

References Cited in the file of this patent

UNITED STATES PATENTS

| 1,940,757 | Lehmann et al. | Dec. 26, 1933 |
| 2,769,839 | Fincke | Nov. 6, 1956 |
| 2,816,094 | Melamed et al. | Dec. 10, 1957 |

OTHER REFERENCES

Foster et al.: "Jour. Am. Chem. Soc.," vol. 46, pages 1936 to 1948 (1924).

Synder et al.: "Jour. Am. Chem. Soc.," vol. 69, pages 2672 to 2677 (1947).